Patented June 20, 1950

2,512,037

UNITED STATES PATENT OFFICE 2,512,037

DICYANDIAMIDE ACID SULFATE

Joseph H. Paden and Alexander F. MacLean, Stamford, Conn., assignors to American Cyanamid Company, New York, N. Y., a corporation of Maine No Drawing. Application October 25, 1945, Serial No. 624,577

3 Claims. (Cl. 23—190)

This invention relates to the sulfate salts of dicyandiamide and to methods of preparing the same.

It has been recorded in the literature that dicyandiamide, a neutral compound having a low ionization constant would not form salts with acids in aqueous solutions. In spite of this argument which refutes the formation of such salts, it has now been discovered that sulfate salts of dicyandiamide can be prepared.

The sulfate salts are prepared by reacting dicyandiamide with sulfuric acid in a solvent for either or both of the reactants. Suitable solvents are ethers, esters, acids, ketones and the like. The following example will serve to illustrate the preparation of a sulfate salt of dicyandiamide:

EXAMPLE

Dicyandiamide acid sulfate

| Reactants: | Molar Ratio |
|---|---|
| Dicyandiamide | 1.00 |
| Sulfuric acid | 1.05 |
| Acetic acid, glacial | 8.40 |

The sulfuric acid is dissolved in partially frozen glacial acetic acid to prevent overheating. After the dicyandiamide is added to this cold mixture, the temperature is raised to 20° C. and a clear solution results. Crystals of the dicyandiamide acid sulfate soon form and when crystallization is complete, the reaction mixture is diluted with methyl ethyl ketone. After filtering and washing with fresh methyl ethyl ketone, the colorless crystals are dried under vacuum at 40° C. By means of a potentiometric titration, the molecular weight was found to agree closely with the theoretical value of 182. This sulfate salt is hydrolyzed to the corresponding salt of guanylurea when exposed to moist air.

Dicyandiamide acid sulfate does not have a sharp melting or decomposition point, and since the analytical data checks the theoretical composition, the optical and crystallographic properties are herein presented to characterize the sulfate. Dicyandiamide acid sulfate is a white, tabular solid which crystallizes in the triclinic system and has a negative optic sign. In white light the refractive index, $\beta$, is 1.567. The apparent optic axial angle as observed in air is 82° and the true optic axial angle calculated therefrom is 48°. An optic axis interference figure or "brush" appears on the most prominent face, and one silhouette angle of this face is 128° ± 30′.

The sulfate salts of dicyandiamide are useful as chemical intermediates in the preparation of flame proofing composition, chemotherapeutic agents, insecticides, synthetic resins and for other purposes.

While the invention has been described with particular reference to specific embodiments, it is to be understood that it is not to be limited thereto but is to be construed broadly and restricted solely by the scope of the appended claims.

What is claimed:

1. Dicyandiamide acid sulfate, a white solid crystallizing in triclinic system.

2. A method of preparing dicyandiamide acid sulfate which includes the step of reacting dicyandiamide with sulfuric acid in a nonaqueous solvent for the dicyandiamide and the sulfuric acid below substantially 30° C. to form dicyandiamide acid sulfate, and recovering the same.

3. A method of preparing dicyandiamide acid sulfate which includes the steps of reacting in acetic acid dicyandiamide with sulfuric acid in a molar ratio of substantially 1:1 below substantially 30° C., recovering the dicyandiamide acid sulfate therefrom.

JOSEPH H. PADEN.
ALEXANDER F. MacLEAN.

REFERENCES CITED

The following references are of record in the file of this patent:

FOREIGN PATENTS

| Number | Country | Date |
|---|---|---|
| 17,507 | Great Britain | of 1902 |

OTHER REFERENCES

British Chem. Abstracts, 1933 A, page 940: "Additive Compounds of Mercuric Cyanide with Hydrochlorides of Organic Bases."

Radelberger, Chem. Abstracts, vol. 3, page 905 (1909).

Lidholm, Chem. Abstracts, vol. 7, page 1200 (1913).

Davis, Chem. Abstracts, vol. 15, page 1718 (1921).